United States Patent
Isobe

(10) Patent No.: US 10,805,480 B2
(45) Date of Patent: Oct. 13, 2020

(54) IMAGE OUTPUT SERVICE SYSTEM, IMAGE OUTPUT SUPPORT APPARATUS, AND NON-TRANSITORY COMPUTER READABLE MEDIUM STORING PROGRAM

(71) Applicant: FUJI XEROX CO., LTD., Tokyo (JP)

(72) Inventor: Kimihiko Isobe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/382,214

(22) Filed: Apr. 12, 2019

(65) Prior Publication Data

US 2020/0137240 A1  Apr. 30, 2020

(30) Foreign Application Priority Data

Oct. 30, 2018 (JP) ................. 2018-203505

(51) Int. Cl.
*H04N 1/00* (2006.01)
(52) U.S. Cl.
CPC ....... *H04N 1/00244* (2013.01); *H04N 1/0097* (2013.01); *H04N 1/00973* (2013.01)
(58) Field of Classification Search
CPC ........... H04N 1/00244; H04N 1/00973; H04N 1/0097

USPC ............................... 358/1.14, 1.15
See application file for complete search history.

(56) References Cited

U.S. PATENT DOCUMENTS

| | | | |
|---|---|---|---|
| 7,164,486 B1 * | 1/2007 | Nakamura | G03G 15/36 358/1.1 |
| 7,742,183 B2 * | 6/2010 | Sato | G06K 15/00 358/1.13 |

FOREIGN PATENT DOCUMENTS

JP  2015168132  9/2015

\* cited by examiner

*Primary Examiner* — Tammy Paige Goddard
*Assistant Examiner* — Darryl V Dottin
(74) *Attorney, Agent, or Firm* — JCIPRNET

(57) ABSTRACT

An image output service system on a cloud, that outputs information used for image output, includes a converting portion that obtains image data after a converting process from image data before the converting process, by the converting process according to an image output unit that outputs an image, and an output portion that outputs an information group for image output including the image data after the converting process and provision information indicating what types of plural pieces of information the information group is configured by and where each of the pieces of information is arranged.

11 Claims, 5 Drawing Sheets

IMAGE OUTPUT SERVICE SYSTEM, IMAGE OUTPUT SUPPORT APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-203505 filed Oct. 30, 2018.

BACKGROUND (i) Technical Field

The present invention relates to an image output service system, an image output support apparatus, and a non-transitory computer readable medium storing a program.

(ii) Related Art

There is known a technology in which an image converting process according to an image output unit included in an apparatus such as a printer is executed on image data described by, for example, a page description language or the like to obtain image data in a raster format, for example, as image data after the converting process. JP2015-168132A discloses an image forming system in which a plurality of raster image process (RIP) units for performing a drawing development process on print data into raster data are provided and an RIP is distributed and executed in parallel.

SUMMARY

In a case of executing the converting process on the image data, in general, as the amount of image data increases, a load of the converting process also increases. For this reason, for example, in a case where a support apparatus which supports an image output by the image output unit executes the image converting process according to the image output unit, in a case where the amount of image data is large, the load of the converting process becomes enormous, so that it is considered to take a long time for the converting process.

On the other hand, in recent years, various services using cloud computing (hereinafter, simply referred to as "cloud") are realized. For example, by providing image data after the converting process to the support apparatus by a cloud service, it is possible to avoid the load of the converting process from being concentrated on the support apparatus. However, the image output by the image output unit requires information other than the image data after the converting process according to the image output unit. It is expected to realize a cloud service for collecting and providing the information used for the image output.

Aspects of non-limiting embodiments of the present disclosure relate to an image output service system, an image output support apparatus, and a non-transitory computer readable medium storing a program realizing a cloud service capable of outputting an information group for image output including image data after a converting process according to an image output unit and provision information indicating a configuration and an arrangement of the information group.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image output service system on a cloud that outputs information used for image output, the service system including: a converting portion that obtains image data after a converting process from image data before the converting process, by the converting process according to an image output unit that outputs an image; and an output portion that outputs an information group for image output including the image data after the converting process and provision information indicating what types of a plurality of pieces of information the information group is configured by and where each of the pieces of information is arranged.

BRIEF DESCRIPTION OF THE DRAWINGS

Exemplary embodiment(s) of the present invention will be described in detail based on the following figures, wherein.

DETAILED DESCRIPTION

Figure 1:
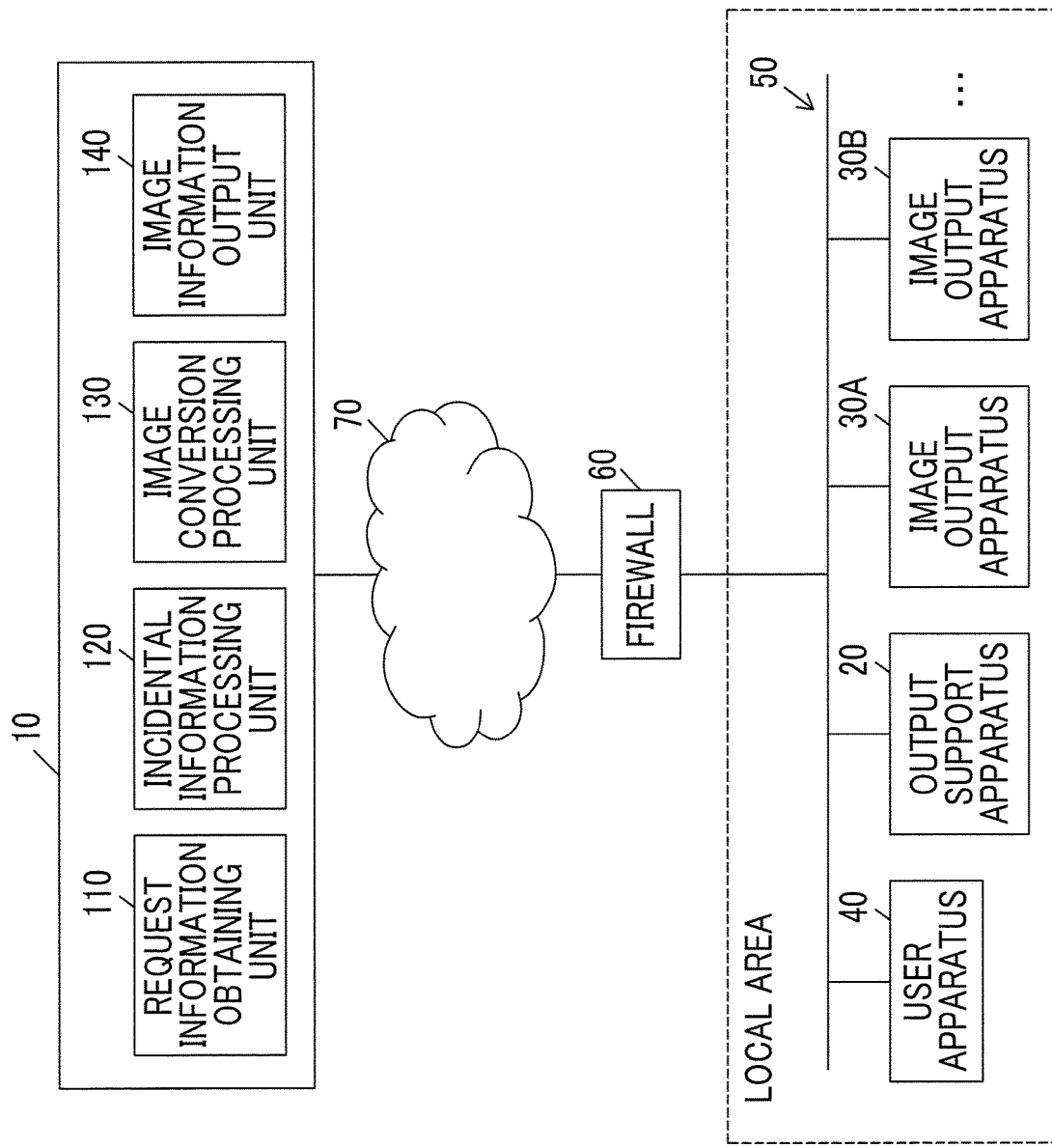
FIG. 1 is a diagram illustrating a specific example of an image output system.

FIG. 1 is a diagram illustrating a specific example of the exemplary embodiment of the invention. FIG. 1 illustrates a specific example of an image output system which includes a service system 10, an output support apparatus 20, an image output apparatus 30, and a user apparatus 40.

In the specific example illustrated in FIG. 1, the service system 10 is communicably connected to a public network (a public communication line) 70 and realizes a cloud service which provides information used for image output by the image output apparatus 30 in a local area. The public network 70 is, for example, a communication line using at least one of wireless communication or wired communication, and a specific example of the public network 70 includes the internet and the like.

The service system 10 illustrated in FIG. 1 includes a request information obtaining unit 110, an incidental information processing unit 120, an image conversion processing unit 130, and an image information output unit 140.

The request information obtaining unit 110 obtains request information for requesting an image output. For example, the request information obtaining unit 110 obtains the request information from the output support apparatus 20 or the user apparatus 40 in the local area. For example, the request information is configured to include image data which is an image output target, incidental information of the image data, and the like. A specific example of the request information includes, for example, a print job and the like.

The incidental information processing unit 120 processes incidental information included in request information obtained by the request information obtaining unit 110. The incidental information is information used for outputting an image of image data of an image output target, and is configured to include, for example, job property information, profile information, imposition configuration information, resource file information, and the like.

The image conversion processing unit 130 executes an image converting process on image data included in the request information obtained by the request information obtaining unit 110. The image conversion processing unit 130 executes the image converting process according to an image output unit included in the image output apparatus 30 in the local area, for example, on image data before the converting process described by, for example, a page description language or the like to obtain image data (raster data) in a raster format, for example, as image data after the converting process. In addition, the image conversion processing unit 130 may obtain an intermediate file obtained, for example, in an intermediate stage of the converting process into a raster format as image data after the converting process according to the image output unit.

The image information output unit 140 outputs information used for the image output. For example, the image information output unit 140 outputs an information group for image output including the image data after the converting process by the image conversion processing unit 130 and provision information indicating what types of a plurality of pieces of information the information group is configured by and where each of the pieces of information is arranged, as information (image output information) used for the image output.

The service system 10 illustrated in FIG. 1 may be realized by using, for example, one or more computers. The computer includes hardware resources of an arithmetic device such as a CPU, a storage device such as a memory or a hard disk, a communication device using a communication line such as the internet, a device for reading data from a storage medium such as an optical disc, a semiconductor memory, or a card memory, a display device such as a display, an operation device for receiving an operation from a user, and the like.

For example, a program (software) corresponding to functions of at least some among components included in the service system 10 illustrated in FIG. 1 is read into the computer and at least some functions of the service system 10 is realized by the computer according to a collaboration between the hardware resources of the computer and the read software. For example, the program may be provided to a computer (the service system 10) via a communication line such as the internet, or may be stored in a storage medium such as an optical disk, a semiconductor memory, a card memory, or the like and provided to the computer (the service system 10). In addition, the program may be stored in advance in the storage device of the computer (the service system 10).

In the specific example illustrated in FIG. 1, the output support apparatus 20, the image output apparatus 30, and the user apparatus 40 are in a local area and are communicatively connected to one another via a local area network 50 so as to exchange data (information). In addition, the local area network 50 is connected to the public network 70 via a firewall 60.

The output support apparatus 20 supports image output by the image output unit. A specific example of the output support apparatus 20 includes a digital front end (DFE) and the like. Information used by the output support apparatus 20 to support the image output may be obtained from, for example, the service system 10 or may be generated by the output support apparatus 20.

The image output apparatus 30 includes the image output unit which outputs an image. In the specific example illustrated in FIG. 1, a plurality of image output apparatuses 30 (30A, 30B, . . . ) are in the local area, and each of the image output apparatuses 30 includes an image output unit, for example. A specific example of the image output unit includes a print device for printing an image on a medium such as paper.

Although FIG. 1 illustrates the specific example in which the output support apparatus 20 and the image output apparatus 30 are separate apparatuses, the output support apparatus 20 and the image output apparatus 30 may be combined into one apparatus. For example, the image output apparatus 30 may have a function related to support of the image output provided in the output support apparatus 20.

The user apparatus 40 is a terminal apparatus used by a user who requests image output. A specific example of the user apparatus 40 includes an information processing apparatus such as a personal computer or the like and a mobile terminal apparatus such as a smartphone, a tablet terminal, or the like.

Figure 2:
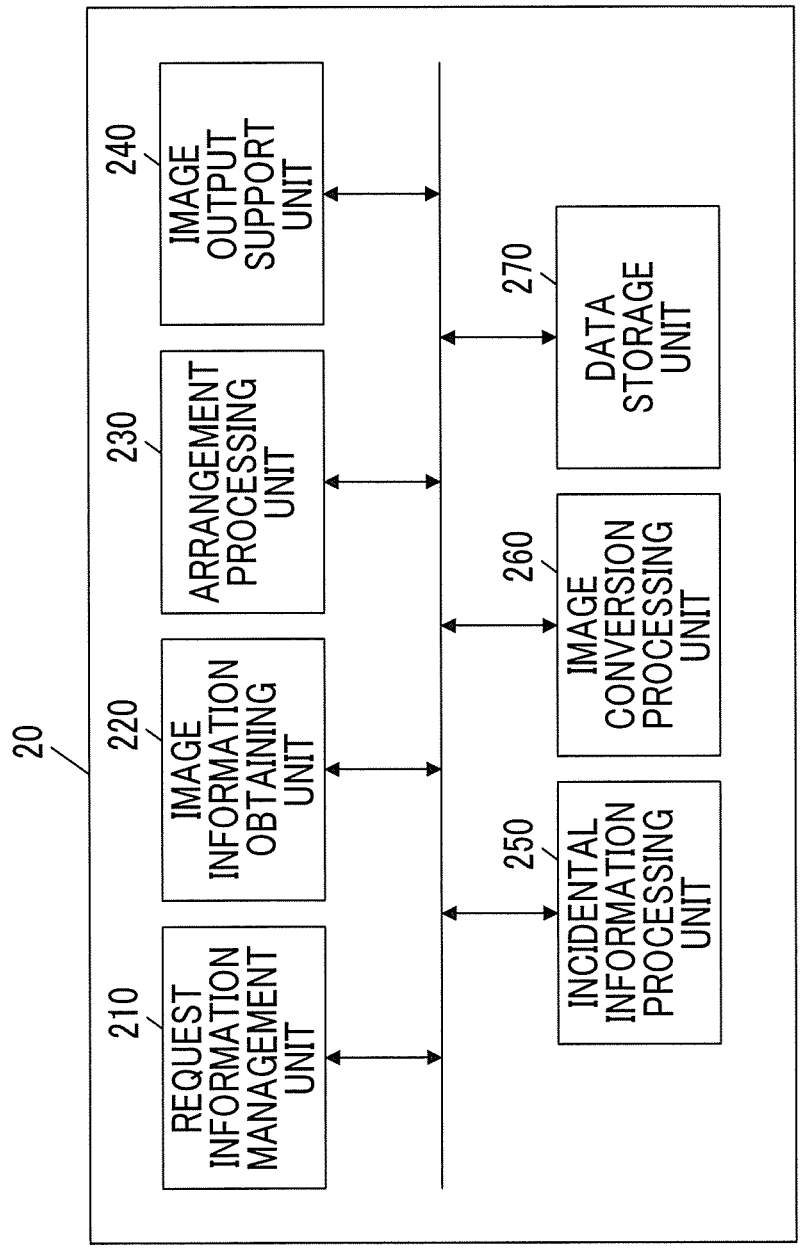
FIG. 2 is a diagram illustrating a specific example of an output support apparatus.

FIG. 2 is a diagram illustrating a specific example of the output support apparatus 20. FIG. 2 illustrates a specific example of the output support apparatus 20 constituting the image output system (see FIG. 1). The output support apparatus illustrated in FIG. 2 includes a request information management unit 210, an image information obtaining unit 220, an arrangement processing unit 230, an image output support unit 240, an incidental information processing unit 250, an image conversion processing unit 260, and a data storage unit 270.

The request information management unit 210 manages request information for requesting an image output. For example, the request information management unit 210 manages the request information from the user apparatus 40 in the local area. For example, the request information is configured to include image data which is an image output target, incidental information of the image data, and the like. A specific example of the request information includes, for example, a print job and the like.

The image information obtaining unit 220 obtains information used for the image output. For example, in a case of causing the service system 10 to execute a process according to the request information managed by the request information management unit 210, the image information obtaining unit 220 obtains an image output information group output from the service system 10 and provision information related to the information group as information used for the image output.

The arrangement processing unit 230 rearranges the information used for the image output. For example, in the case of causing the service system 10 to execute the process according to the request information managed by the request information management unit 210, the arrangement processing unit 230 rearranges the information group for image output obtained from the service system 10, according to an arrangement indicated by the provision information.

The image output support unit 240 supports the image output by the image output unit by using image output information. The image output support unit 240 supports the image output by the image output unit included in the image output apparatus 30 by using the information group for image output rearranged by the arrangement processing unit 230, for example.

The incidental information processing unit 250 manages the incidental information included in the request information. For example, in a case where the output support apparatus 20 executes a process according to the request information managed by the request information management unit 210 without using a service by the service system 10, the incidental information processing unit 250 manages the incidental information included in the request information. The incidental information is information used for outputting an image of image data of an image output target, and is configured to include, for example, job property information, profile information, imposition configuration information, resource file information, and the like.

The image conversion processing unit 260 executes an image converting process on image data included in the request information. For example, in a case where the output support apparatus 20 executes a process according to the request information managed by the request information management unit 210 without using a service by the service system 10, the image conversion processing unit 260 executes the image converting process on the image data included in the request information.

The image conversion processing unit 260 executes the image converting process according to the image output unit included in the image output apparatus 30, for example, on image data before the converting process described by, for example, a page description language or the like to obtain image data (raster data) in a raster format, for example, as image data after the converting process. In addition, the image conversion processing unit 260 may obtain an intermediate file obtained, for example, in an intermediate stage of the converting process into a raster format as image data after the converting process according to the image output unit.

The data storage unit 270 stores various pieces of information (data) used by the output support apparatus 20. For example, the information group for image output rearranged by the arrangement processing unit 230 may be stored in one or more folders in the data storage unit 270.

The output support apparatus 20 illustrated in FIG. 2 may be realized by using, for example, one or more computers. The computer includes hardware resources of an arithmetic device such as a CPU, a storage device such as a memory or a hard disk, a communication device using a communication line such as the internet, a device for reading data from a storage medium such as an optical disc, a semiconductor memory, or a card memory, a display device such as a display, an operation device for receiving an operation from a user, and the like.

For example, a program (software) corresponding to functions of at least some among components included in the output support apparatus 20 illustrated in FIG. 2 is read into the computer and at least some functions of the output support apparatus 20 is realized by the computer according to a collaboration between the hardware resources of the computer and the read software. For example, the program may be provided to a computer (the output support apparatus 20) via a communication line such as the internet, or may be stored in a storage medium such as an optical disk, a semiconductor memory, a card memory, or the like and provided to the computer (the output support apparatus 20). In addition, the program may be stored in advance in the storage device of the computer (the output support apparatus 20).

An overall configuration of the image output system (including the output support apparatus 20 illustrated in FIG. 2) illustrated in FIG. 1 is as described above. Next, a specific example of a process realized by the image output system in FIG. 1 will be described in detail. Regarding the configurations (portions) illustrated in FIGS. 1 and 2, the reference numerals in FIGS. 1 and 2 are used in the following description.

Figure 3:
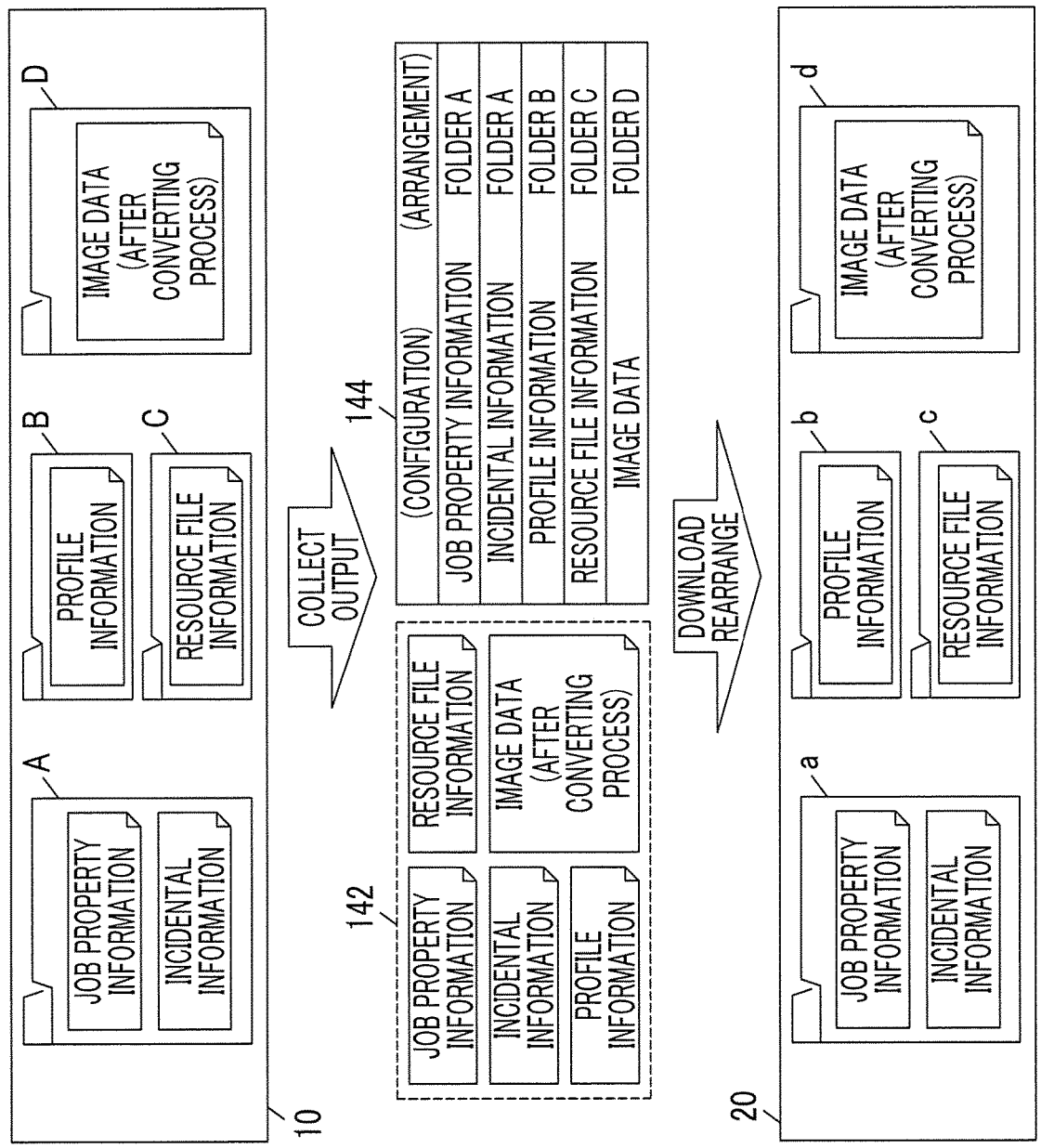
FIG. 3 is a diagram for explaining a specific example of a cloud service for providing information used for image output.

FIG. 3 is a diagram for explaining a specific example of a cloud service for providing information used for image output. FIG. 3 illustrates a specific example of a cloud service realized by the image output system (including the output support apparatus 20 in FIG. 2) in FIG. 1.

In a case of using the cloud service by the service system 10, request information for requesting image output is transmitted from a local area side to the service system 10. For example, the request information may be transmitted from the user apparatus 40 to the service system 10, or the output support apparatus 20 may transmit the request information obtained from the user apparatus 40 to the service system 10.

In a case where the request information obtaining unit 110 obtains the request information transmitted from the local area side to the service system 10, the incidental information processing unit 120 manages the incidental information included in the request information and the image conversion processing unit 130 executes the image converting process on the image data included in the request information. A plurality of pieces of information constituting the incidental information and image data after the converting process are developed and arranged in one or more folders on a cloud used by the service system 10, for example.

FIG. 3 illustrates job property information, imposition configuration information, profile information, and resource file information, as a specific example of the incidental information. The job property information includes a setting value related to a plurality of setting items related to image output such as a setting of color output or monochrome output, a setting of a size and a quality of output paper, or the like.

The imposition configuration information is information related to a setting such as an imposition layout of an output image or the like. A specific example of the imposition configuration information includes a setting value related to an imposition layout such as N-up in which arranged documents having N pages (N is a natural number) are handled as one document.

The profile information is information defining a parameter (a color profile) expressing a color of an output image such as luminance, brightness, a color temperature, a color difference, and the like, for example. In addition, the resource file information is configured by various resource files necessary for outputting an image.

In the specific example illustrated in FIG. 3, the plurality of pieces of information constituting the incidental information and the image data after the converting process are developed and arranged in folders A to D on a cloud. That is, in the specific example illustrated in FIG. 3, the job property information and the imposition configuration information are arranged in the folder A, the profile information is arranged in the folder B, the resource file information is arranged in the folder C, and the image data after the converting process is arranged in the folder D.

The service system 10 generates the information group for image output including the image data after the converting process and the provision information indicating what types of the plurality of pieces of information the information group is configured by and where each of the pieces of information is arranged.

The service system 10 generates information group by collecting a plurality of pieces of information constituting the incidental information developed and arranged in one or more folders on the cloud and the image data after the converting process, for example. A data group 142 illustrated in FIG. 3 is one specific example related to the information group for image output. FIG. 3 illustrates the data group 142 configured by the job property information, the imposition configuration information, the profile information, the resource file information, and the image data after the converting process.

Further, the service system 10 generates provision information on the information group for image output. The provision information on the information group for image output is information indicating what types of a plurality of pieces of information the information group is configured by and where each of the pieces of information constituting the information group is arranged. In order to indicate what types of the plurality of pieces of information the information group is configured by, an information name (a data name, a file name, or the like) of each of the pieces of information may be indicated, or contents (a characteristic term and the like) of each of the pieces of information may be indicated, for example. In addition, in order to indicate where each of the pieces of information constituting the information group is arranged, a storage location (a folder name or the like) in which each of the pieces of information is stored may be indicated, or a route (a path or the like) of the storage location in which each of the pieces of information is stored.

Configuration arrangement information 144 illustrated in FIG. 3 is one specific example of the provision information related to the information group for image output. The configuration arrangement information 144 illustrated in FIG. 3 indicates what types of a plurality of pieces of information the data group 142 is configured by and what folder each of the pieces of information is arranged in.

In the specific example illustrated in FIG. 3, the configuration arrangement information 144 illustrates a list of information names of a plurality of pieces of information constituting the data group 142. That is, the configuration arrangement information 144 in FIG. 3 illustrates that the data group 142 is configured by the job property information, the imposition configuration information, the profile information, the resource file information, and the image data (after the converting process).

In addition, in the specific example illustrated in FIG. 3, the configuration arrangement information 144 illustrates a name of a folder in which each of the pieces of information constituting the data group 142 is arranged. That is, the configuration arrangement information 144 in FIG. 3 illustrates that the job property information is arranged in the folder A on the cloud, the imposition configuration information is arranged in the folder A on the cloud, the profile information is arranged in the folder B on the cloud, the resource file information is arranged in the folder C on the cloud, and the image data (after the converting process) is arranged in the folder D on the cloud.

The service system 10 outputs the generated information group for image output and the provision information on the information group. For example, the image information output unit 140 of the service system 10 outputs the data group 142 and the configuration arrangement information 144 in response to a request from the output support apparatus 20.

The output support apparatus 20 obtains the image output information group output from the service system 10 on the cloud and the provision information. For example, the image information obtaining unit 220 of the output support apparatus downloads and obtains the data group 142 and the configuration arrangement information 144 output from the service system 10.

The output support apparatus 20 rearranges the information group for image output obtained from the service system 10 according to an arrangement indicated by the provision information. For example, the arrangement processing unit 230 of the output support apparatus 20 develops and rearranges the plurality of pieces of information constituting the data group 142 obtained from the service system 10 into one or more folders according to the arrangement indicated by the configuration arrangement information 144.

For example, the arrangement processing unit 230 develops and rearranges the plurality of pieces of information constituting the data group 142 into one or more folders in the local area (for example, in the data storage unit 270) used by the output support apparatus 20.

According to the arrangement indicated by the configuration arrangement information 144, the arrangement processing unit 230 develops and rearranges the plurality of pieces of information constituting the data group 142 into folders a to d in the local area. For example, the configuration arrangement information 144 indicates that the job property information and the imposition configuration information are arranged in the folder A on the cloud. Therefore, the arrangement processing unit 230 rearranges the job property information and the imposition configuration information in the folder a in the local area corresponding to the folder A on the cloud.

In addition, since the configuration arrangement information 144 indicates that the profile information is arranged in the folder B on the cloud, the arrangement processing unit 230 rearranges the profile information in the folder b in the local area corresponding to the folder B on the cloud. Further, since the configuration arrangement information 144 indicates that the resource file information is arranged in the folder C on the cloud, the arrangement processing unit 230 rearranges the resource file information in the folder c in the local area corresponding to the folder C on the cloud. In addition, since the configuration arrangement information 144 indicates that the image data (after the converting process) is arranged in the folder D on the cloud, the arrangement processing unit 230 rearranges the image data after the converting process in the folder d in the local area corresponding to the folder D on the cloud.

In the specific example illustrated in FIG. 3, for example, the plurality of pieces of information constituting the data group 142 collected from the folders A to D on the cloud are developed and rearranges into the folders a to d in the local area. That is, in the specific example illustrated in FIG. 3, the information group for image output developed on the cloud is developed in the local area according to arrangement as the same manner in the cloud. For example, the information group for image output may be developed in the local area in an arrangement manner different from the manner on the cloud according to a predetermined arrangement condition or the like.

In a case where the information group for image output obtained from the service system 10 is developed into the local area, the output support apparatus 20 uses the information group for image output developed into the local area so as to support image output by the image output unit. For example, in the specific example illustrated in FIG. 3, the image output support unit 240 of the output support apparatus 20 uses the plurality of pieces of information constituting the data group 142 developed in the local area so as to support image output by the image output unit included in the image output apparatus 30. For example, an image of the image data arranged in the folder d is output from the image output apparatus 30 according to a setting or the like indicated by the incidental information arranged in the folders a to c.

The output support apparatus 20 supports image output by the image output unit, and may obtain the information group for image output from the service system 10 and generate the information group for image output by the output support apparatus 20.

Figure 4:
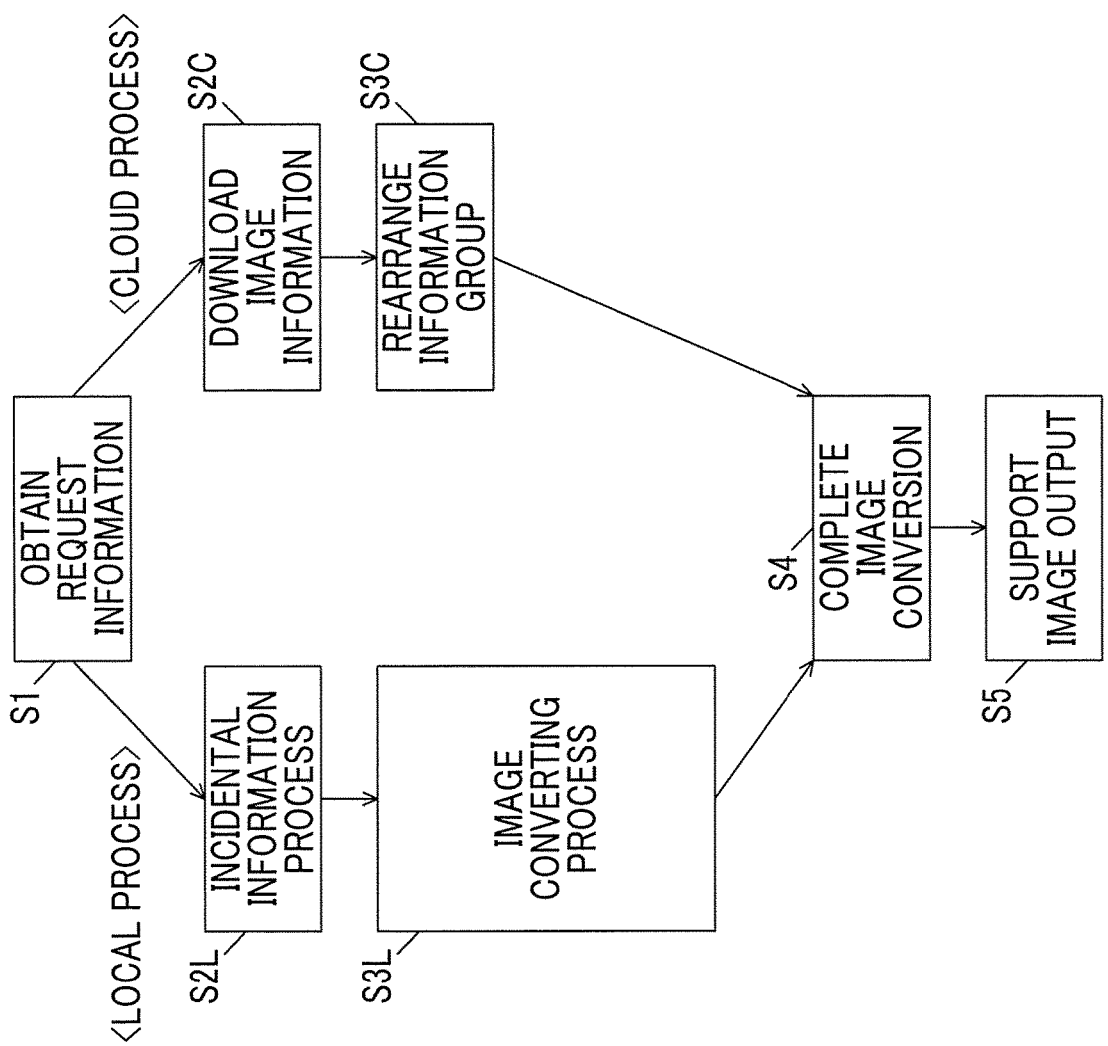
FIG. 4 is a diagram illustrating a specific example of a process executed by the output support apparatus.

FIG. 4 is a diagram illustrating a specific example of a process executed by the output support apparatus 20. FIG. 4 illustrates a specific example of a local process in which the output support apparatus 20 generates information group for image output and a cloud process in which the output support apparatus 20 obtains the information group for image output from the service system 10.

In a case where the output support apparatus 20 obtains request information for image output (S1), the local process or the cloud process is selected. For example, in a case where the local process or the cloud process is designated in the request information, the output support apparatus 20 may select the local process or the cloud process according to the designation. Further, for example, the local process or the cloud process may be selected according to the amount of image data included in the request information. For example, the local process may be selected in a case where the amount of image data is equal to or less than a threshold value and the cloud process may be selected in a case where the amount of image data exceeds the threshold value. The local process or the cloud process may be selected according to a load situation or the like of the output support apparatus 20.

In the local process, the output support apparatus 20 executes a process of the incidental information (S2L) and an image converting process (S3L). For example, the incidental information processing unit 250 of the output support apparatus 20 processes the incidental information included in the request information, so that the incidental information such as the job property information, the profile information, the imposition configuration information, the resource file information, or the like is developed in the folder in the local area.

Further, for example, the image conversion processing unit 260 of the output support apparatus 20 executes the image converting process on the image data included in the request information, so that the image data after the converting process is developed in the folder in the local area.

In a case where the image data after the converting process is developed in the folder in the local area, the output support apparatus 20 shifts to a completion state of image conversion (S4). The image output support unit 240 of the output support apparatus 20 uses the plurality of pieces of image output information developed in the local area so as to support image output by the image output unit included in the image output apparatus 30 (S5).

In the cloud process, the request information is transmitted to the service system 10, the service system 10 executes the process of the incidental information and the image converting process according to the request information, and the service system 10 generates image output information.

The image information obtaining unit 220 of the output support apparatus 20 downloads and obtains the information group for image output corresponding to the request information obtained in (S1) and the provision information related to the information group from the service system 10 (S2C). In addition, the arrangement processing unit 230 of the output support apparatus 20 develops and rearranges the information group for image output obtained from the service system 10 in the local area according to an arrangement indicated by the provision information related to the information group (S3C).

In a case where the image data after the converting process is developed in the folder in the local area according to the rearrangement, the output support apparatus 20 shifts to the completion state of the image conversion (S4). Further, the image output support unit 240 of the output support apparatus 20 uses the plurality of pieces of image output information developed in the local area so as to support image output by the image output unit included in the image output apparatus 30 (S5).

In a case of comparing the local process and the cloud process, in the local process, the image conversion processing unit 260 of the output support apparatus 20 executes the image converting process on the image data included in the request information. Therefore, for example, in a case where the amount of image data is large, it takes time to convert the image (S3L), and it takes a long time since the request information is obtained (S1) until shifting to the completion state of the image conversion (S4).

On the other hand, in the cloud process, for example, even in a case where the amount of image data is large, the service system 10 may be caused to execute the converting process on the image data in advance (for example, at night). After obtaining the request information (S1), the image output information group including the image data already conversion-processed is downloaded (S2C) and the image output information group is rearranged in the local area (S3C), so that the conversion (S4) to the completion state of the image conversion is realized by omitting the image converting process (S3L) which takes a long time.

In addition, in the local process, for example, even in a case where one output support apparatus 20 executes the image converting process one by one on a plurality of pieces of image data corresponding to a plurality of pieces of request information, the converting processes for the plurality of image data take a long time.

On the other hand, in the cloud process, for example, in a case where the service system 10 is caused to execute the converting process of the image data on the plurality of pieces of image data in advance (for example, at night), a long time is not required for the image converting process by the output support apparatus 20. For example, the service system 10 may execute the image converting process in parallel on the plurality of pieces of image data.

In a case where the output support apparatus 20 supports image output, image data obtained by the converting process according to the image output unit to be supported is used. For example, in the image output system illustrated in FIG. 1, in a case where the output support apparatus 20 supports image output by an image output apparatus 30A, image data after a converting process according to an image output unit included in the image output apparatus 30A is used. For example, in a case where the output support apparatus 20 supports image output by an image output apparatus 30B, image data after a converting process according to an image output unit included in the image output apparatus 30B is used.

Figure 5:
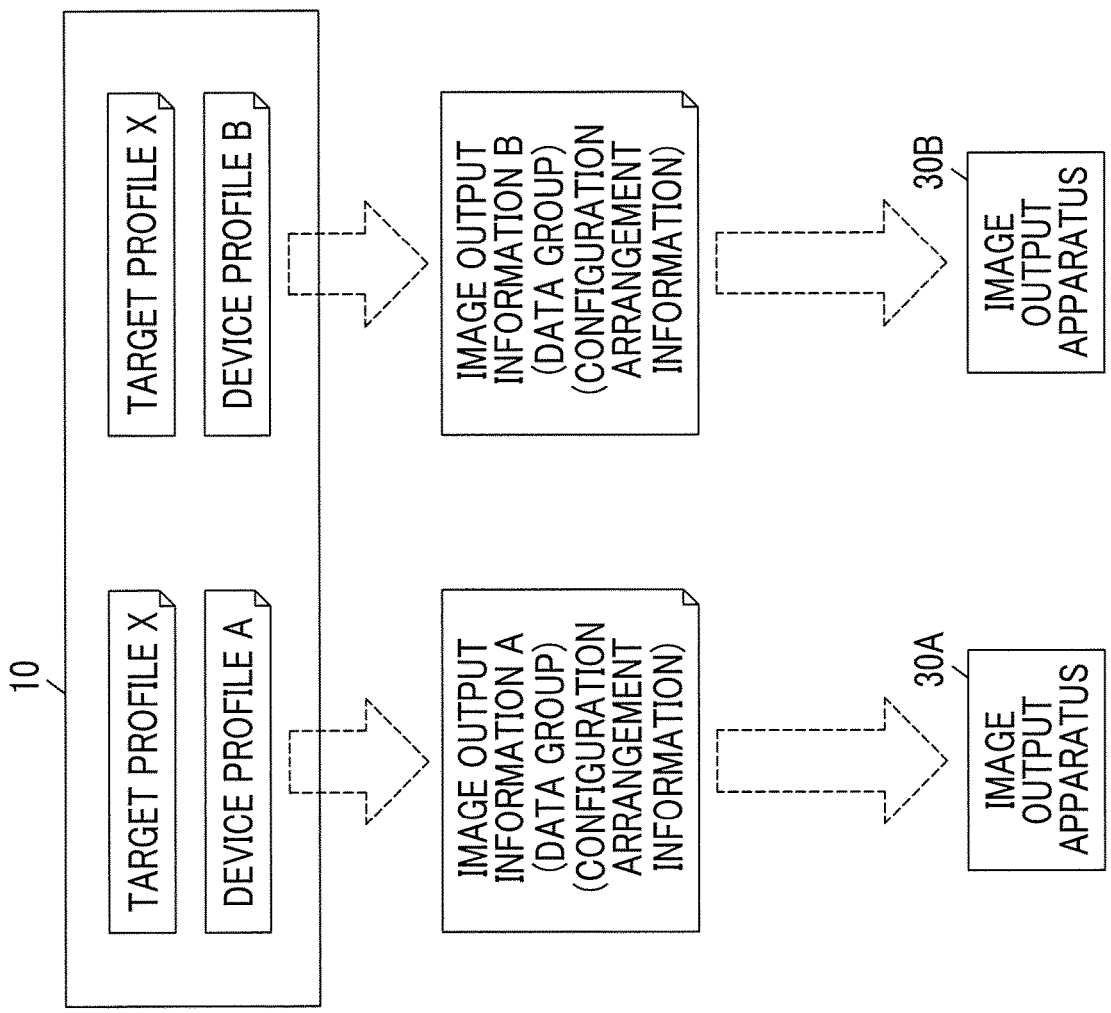
FIG. 5 is a diagram illustrating a specific example of image output information corresponding to a plurality of image output units.

FIG. 5 is a diagram illustrating a specific example of image output information corresponding to a plurality of image output units. FIG. 5 illustrates pieces of image output information corresponding to the plurality of image output units obtained from identical request information.

The image conversion processing unit 130 of the service system 10 generates pieces of image data after a plurality of converting processes corresponding to the plurality of image output units, from image data before the converting process, by the converting process according to each of the plurality of image output units having different characteristics from one another. In addition, the image information output unit 140 of the service system 10 outputs information group for image output including the image data after the converting process corresponding to the image output unit and provision information related to the information group, as information used for image output by each of the image output units.

For example, in the specific example illustrated in FIG. 5, image output information A is information used for image output by the image output apparatus 30A and image output information B is information used for image output by the image output apparatus 30B. For example, the image output information A is configured by a data group (see FIG. 3) including the image data obtained by the converting process according to the image output unit of the image output apparatus 30A and configuration arrangement information (see FIG. 3) related to the data group. In addition, for example, the image output information B is configured by a data group (see FIG. 3) including the image data obtained by the converting process according to the image output unit of the image output apparatus 30B and configuration arrangement information (see FIG. 3) related to the data group.

Based on information defining a target state of image output, the service system 10 may generate an information group for image output corresponding to the identical target state in the plurality of image output units. For example, in the specific example illustrated in FIG. 5, a target profile X is one specific example of information defining a target state of image output. As the target profile X, for example, a target value or the like of color reproducibility prescribed in a standard such as Japan color conforming to international organization for standardization (ISO) may be used.

In addition, in the specific example illustrated in FIG. 5, a device profile A is information for indicating a characteristic of the image output unit included in the image output apparatus 30A and a device profile B is information for indicating a characteristic of the image output unit included in the image output apparatus 30B.

In the specific example illustrated in FIG. 5, based on the target profile X for defining a target state of image output, the service system 10 generates the image output information A corresponding to the image output unit of the image output apparatus 30A of which a characteristic is indicated in the device profile A and the image output information B corresponding to the image output unit of the image output apparatus 30B of which a characteristic is indicated in the device profile B, from the identical image data before the converting process.

For example, based on the target profile X and the device profile A, the service system 10 generates the image output information A for causing the image output unit of the image output apparatus 30A to realize the target state such as color reproducibility or the like indicated in the target profile X. In addition, for example, based on the target profile X and the device profile B, the service system 10 generates the image output information B for causing the image output unit of the image output apparatus 30B to realize the target state such as color reproducibility or the like indicated in the target profile X.

Accordingly, the plurality of image output units having different characteristics from one another realize image output corresponding to the identical target state. For example, according to the specific example illustrated in FIG. 5, even in a case where the image output unit of the image output apparatus 30A and the image output unit of the image output apparatus 30B have characteristics different from each other, the image output apparatus 30A and the image output apparatus 30B realize image output corresponding to the target state indicated in the target profile X.

In addition, in preparation for an incident such as a trouble related to each of the image output units, pieces of image output information corresponding to the plurality of image output units may be generated from the identical request information. For example, in the specific example illustrated in FIG. 5, the service system 10 generates the image output information B corresponding to the image output apparatus 30B together with the image output information A corresponding to the image output apparatus 30A, from the request information for requesting image output by the image output apparatus 30A.

Accordingly, for example, even in a case where some troubles occur in the image output apparatus 30A and the image output apparatus 30A cannot perform image output or the image output by the image output apparatus 30A is interrupted, the image output apparatus 30B realizes the image output by using the already generated image output information B.

As described above, the exemplary embodiment of the invention is described, but the described exemplary embodiment is merely an example in all respects and is not intended to limit the scope of the invention. The exemplary embodiment of the invention includes various modifications without departing from the scope of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image output service system on a cloud that outputs information used for image output, the image output service system comprising at least one computer, wherein in response to a request information for requesting image output from a local area, the at least one computer is configured to:
   obtain image data after a converting process from image data before the converting process, by the converting process according to an image output unit in the local area that outputs an image; and
   output an information group for image output to the image output unit in the local area, wherein the information group for image output including the image data after the converting process and provision information indicating what types of a plurality of pieces of information the information group is configured by and where each of the pieces of information is arranged.

2. The image output service system according to claim 1, wherein the computer outputs the provision information indicating in which folder each of the pieces of information, constituting the information group for image output, developed in one or more folders is arranged, and the plurality of pieces of information constituting the information group for image output, which is output from the computer, are developed and rearranged in one or more folders according to an arrangement indicated by the provision information, by a support apparatus that supports image output by the image output unit.

3. The image output service system according to claim 1, wherein the computer generates pieces of image data after a plurality of converting processes corresponding to a plurality of image output units, from image data before the converting process, by the converting process according to each of the plurality of image output units having different characteristics from one another, and the computer outputs the information group for image output including the image data after the converting process corresponding to the image output unit and the provision information related to the information group, as information used for image output by each of the image output units.

4. The image output service system according to claim 2, wherein the computer generates pieces of image data after a plurality of converting processes corresponding to a plurality of image output units, from image data before the converting process, by the converting process according to each of the plurality of image output units having different characteristics from one another, and the computer outputs the information group for image output including the image data after the converting process corresponding to the image output unit and the provision information related to the information group, as information used for image output by each of the image output units.

5. The image output service system according to claim 3, wherein based on information defining a target state of image output, the information group for image output corresponding to the identical target state in the plurality of image output units is generated.

6. The image output service system according to claim 4, wherein based on information defining a target state of image output, the information group for image output corresponding to the identical target state in the plurality of image output units is generated.

7. An image output support apparatus for supporting image output by an image output unit, the support apparatus comprising a processor configured to:

obtain an information group for image output including image data after a converting process according to the image output unit and provision information indicating what types of a plurality of pieces of information the information group is configured by and where each of the pieces of information is arranged, from a service system on a cloud;

rearrange the information group for image output obtained from the service system, according to an arrangement indicated by the provision information; and support the image output by the image output unit by using the rearranged information group for image output.

8. The image output support apparatus according to claim 7, wherein the processor obtains the provision information indicating in which folder each of the pieces of information, constituting the information group for image output, developed in one or more folders on the cloud is arranged, and the processor develops and rearranges the plurality of pieces of information constituting the information group for image output obtained from the service system, in one or more folders according to an arrangement indicated by the provision information.

9. A non-transitory computer readable medium storing a program causing a computer on a cloud that outputs information used for image output in response to a request information for requesting the image output from a local area, the program causing the computer to:

obtain image data after a converting process from image data before the converting process, by the converting process according to an image output unit that outputs an image; and output an information group for image output to the image output unit in the local area, wherein the information group for image output including the image data after the converting process and provision information indicating what types of a plurality of pieces of information the information group is configured by and where each of the pieces of information is arranged.

10. The image output support apparatus according to claim 7, the processor further configured to:

send a request information for requesting image output to the service system on the cloud according to an amount of image data included in the request information.

11. The image output support apparatus according to claim 7, the processor further configured to:

send a request information for requesting image output to the service system on the cloud according to a designation.

* * * * *